United States Patent
Loccufier et al.

(10) Patent No.: US 11,572,482 B2
(45) Date of Patent: *Feb. 7, 2023

(54) AQUEOUS PIGMENT INKJET INK

(71) Applicant: AGFA NV, Mortsel (BE)

(72) Inventors: Johan Loccufier, Mortsel (BE);
Hubertus Van Aert, Mortsel (BE); Luc Decoster, Mortsel (BE)

(73) Assignee: AGFA NV, Mortsel (BE)

( * ) Notice: Subject to any disclaimer, the term of this patent is extended or adjusted under 35 U.S.C. 154(b) by 344 days.

This patent is subject to a terminal disclaimer.

(21) Appl. No.: 16/766,305

(22) PCT Filed: Nov. 26, 2018

(86) PCT No.: PCT/EP2018/082468
§ 371 (c)(1),
(2) Date: May 22, 2020

(87) PCT Pub. No.: WO2019/105867
PCT Pub. Date: Jun. 6, 2019

(65) Prior Publication Data
US 2020/0369902 A1   Nov. 26, 2020

(30) Foreign Application Priority Data
Nov. 30, 2017 (EP) ..................... 17204545

(51) Int. Cl.
| | | |
|---|---|---|
| C09D 11/326 | (2014.01) | |
| B41M 5/00 | (2006.01) | |
| C09D 11/037 | (2014.01) | |
| C09D 11/101 | (2014.01) | |
| C09D 11/102 | (2014.01) | |
| C09D 11/322 | (2014.01) | |
| C09D 11/38 | (2014.01) | |
| B41J 2/21 | (2006.01) | |

(52) U.S. Cl.
CPC .......... *C09D 11/326* (2013.01); *B41J 2/2107* (2013.01); *B41M 5/0023* (2013.01); *C09D 11/037* (2013.01); *C09D 11/101* (2013.01); *C09D 11/102* (2013.01); *C09D 11/322* (2013.01); *C09D 11/38* (2013.01)

(58) Field of Classification Search
CPC ..... C09D 11/326; C09D 11/107; C09D 11/03; C09D 11/037; C09D 11/033; C09D 11/36; C09D 11/40; C09D 11/30; C09D 11/38; C09D 11/32; C09D 11/322; C09D 11/324; C09D 11/328; C09D 11/101; C09D 11/102; C09D 11/005; C09D 11/54; C09D 11/52; C09D 11/106; B41J 2/01; B41J 2/211; B41J 2/1433; B41J 2/17; B41J 2/17593; B41J 2/1755; B41J 2/2114; B41J 2/2117; B41J 2/2056; B41J 2/21; B41J 2/0057; B41J 3/60; B41J 2002/012; B41J 2/04598; B41J 2/04588; B41J 2/04595; B41J 2/04586; B41J 2/14274; B41J 2/1623; B41J 2202/00; B41J 2202/03; B41J 2/14201; B41J 2/045; B41J 11/0015; B41J 11/002; B41J 2/04581; B41J 2/055; B41J 2/16538; B41J 2002/16502; B41J 29/02; B41J 2/17513; B41J 2/17509; B41J 29/13; B41J 2/17553; B41J 2/1606; B41J 2/1642; B41J 2/1609; B41J 2/164; B41J 2/162; B41J 2/161; B41J 2/19; B41J 15/04; B41J 25/001; B41J 25/34; B41J 25/003; B41J 25/312; B41J 2025/008; B41J 2202/21; B41J 2/17596; B41J 2/16508; B41J 2/1652; B41J 2/175; B41J 2/17563; B41M 5/0011; B41M 5/0017; B41M 5/0023; B41M 5/0047; B41M 7/00; B41M 7/0072; B41M 5/52; B41M 5/5218; B41M 5/5227

See application file for complete search history.

(56) References Cited

U.S. PATENT DOCUMENTS

| | | | | | |
|---|---|---|---|---|---|
| 5,853,861 | A | * | 12/1998 | Held | D06P 5/30 428/207 |
| 10,941,309 | B2 | * | 3/2021 | Loccufier | B41M 5/0023 |
| 10,947,405 | B2 | * | 3/2021 | Loccufier | B41M 5/0017 |

(Continued)

FOREIGN PATENT DOCUMENTS

| | | |
|---|---|---|
| EP | 3 351 603 A1 | 7/2018 |
| GB | 2 315 759 A | 2/1998 |

(Continued)

OTHER PUBLICATIONS

Official Communication issued in International Patent Application No. PCT/EP2018/082468, dated Feb. 19, 2019.
Van Aert et al., "Aqueous Polyurethane Resin Dispersion", U.S. Appl. No. 16/766,304, filed May 22, 2020.
Van Aert et al., "Liquid Set for Ink Jet Recording", U.S. Appl. No. 16/766,306, filed May 22, 2020.

(Continued)

*Primary Examiner* — Manish S Shah
(74) *Attorney, Agent, or Firm* — Leydig, Voit & Mayer, Ltd.

(57) ABSTRACT

An aqueous pigment dispersion includes at least one dispersing agent having the general formula:

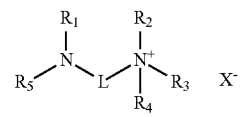

The aqueous pigment dispersion can be used in an aqueous inkjet ink which is useful for printing on textile fabrics.

19 Claims, No Drawings

(56) References Cited

U.S. PATENT DOCUMENTS

2003/0137570 A1* 7/2003 Smith .................... C09D 11/30
                                                    347/100
2008/0090949 A1    4/2008 Nagao et al.
2012/0306976 A1* 12/2012 Kitagawa ............. C09D 11/326
                                                    347/100

FOREIGN PATENT DOCUMENTS

| JP | 2015-163678 A | 9/2015 |
| WO | 2014/042652 A1 | 3/2014 |
| WO | 2018/138069 A1 | 8/2018 |

OTHER PUBLICATIONS

Van Aert et al., "Aqueous Polyurethane Resin Dispersion", U.S. Appl. No. 16/766,307, filed May 22, 2020.
Van Aert et al., "Radiation Curable Polyurethane Resin for Ink Jet Ink", U.S. Appl. No. 16/766,308, filed May 22, 2020.
Wu et al., "A new type of quaternary ammonium salt containing siloxane group and used as favorable dispersant in the surface treatment of C.I. pigment red 170", Progress in Organic Coatings, 63, 2008, pp. 189-194.

* cited by examiner

AQUEOUS PIGMENT INKJET INK

CROSS REFERENCE TO RELATED APPLICATIONS

This application is a 371 National Stage Application of PCT/EP2018/082468, filed Nov. 26, 2018. This application claims the benefit of European Application No. 17204545.2, filed Nov. 30, 2017, which is incorporated by reference herein in its entirety.

BACKGROUND OF THE INVENTION

1. Field of the Invention

The present invention relates to colour pigments stabilised by means of cationic dispersing agents and their use in aqueous inkjet inks.

2. Description of the Related Art

In recent years, inkjet techniques have been increasingly utilized for industrial printing applications such as displays, posters, bulletin boards, packaging, textile, etc. In such applications durability such as light fastness, water resistance, and wear resistance are important requirements of the printed images and pigment based inks therefore have been developed.

Inks, such as solvent-based inkjet inks using an organic solvent as a vehicle and ultraviolet curable inkjet inks including a polymerisable monomer as a main component have been used widely in industrial applications.

However, the solvent-based inkjet inks are not environmentally preferable because the solvent of the ink is evaporated in the air upon drying. The ultraviolet curable inkjet inks have limited application fields because they may have skin sensitizing properties depending on the monomer used and an expensive ultraviolet irradiation apparatus is required to be incorporated to the main body of a printer.

In view of such background, there have been developed pigment based aqueous inks for inkjet recording capable of being directly used for printing on porous and non-porous substrates and which give less environmental load. These inks are characterized by the presence of a resin which binds the pigments and prevents rubbing off the images from the substrate leading to an improved solvent and scratch resistance.

Especially, on non-porous substrates aqueous based pigment inks tend to give low image quality due to the slow evacuation of the aqueous ink carrier leading to migration of colorants, known as intercolor bleeding, coalescence, etc. . . . . On porous substrates such as paper, cardboard and textile fabrics, colorants also tend to migrate before the aqueous carrier is completely absorbed by the porous material. A lot of these substrate materials have a negative zeta-potential in water with a pH range around 7. As most colorants in aqueous inkjet inks carry a negative charge, hardly any fixing of these colorants on the negatively charged substrate material occurs before the ink carrier is evacuated.

Therefore, ink-jet recording media for aqueous ink jet inks such as paper, plastic film or textile fabric are provided with an ink-jet receiving layer provided thereon.

This layer is formed from an ink-jet receiving agent which is mostly a water soluble resin such as polyvinyl alcohol, polyvinyl pyrrolidone and the like and any of various additives, in order to prevent bleeding and coalescence caused by the water based ink or improve ink absorbing property. Image quality problems occur because bleeding and coalescence arises due to insufficient adsorption of the pigment ink into the ink-jet receiving layer.

Moreover, there is a problem that a printed image made by jetting aqueous ink jet inks has poor waterproof characteristics. The most popular method to improve the waterproof characteristics is a method wherein an ink-jet receiving agent is used which includes an aqueous cationic resin such as a poly(diallyldimethylammonium chloride) in addition to the aforementioned resin in the ink. Waterproof characteristics can be improved by fixing of the pigment of the aqueous ink due to the electrostatic bonding between an anionic group of the pigment in the ink and a cationic group of the water-soluble cationic resin. However, since the water-soluble cationic resin itself tends to be easily dissolved in water, the effect for improving waterproof characteristics was insufficient. Furthermore, these polymers do not crosslink with each other nor form a film, leading to poor physical properties of the printed image.

WO14042652 discloses a fixer fluid to be used for making an ink-receiving layer and comprising a liquid vehicle, a surfactant, and a cationic polymer. The cationic polymer can be selected from the group of quaternized polyamines, dicyandiamide polycations, diallyldimethyl ammonium chloride copolymers, quaternized dimethylaminoethyl (meth)acrylate polymers, quaternized vinylimidazol polymers, alkyl guanidine polymers, alkoxylated polyethylene imines.

JP2015163678A discloses an aqueous pigment composition for printing on a porous substrate such as textile which guarantees an improved washing fastness and rubbing resistance of the images on the fabric. The aqueous composition comprises pigment particles containing a urethane resin obtained by reacting polyester polyols with polyols comprising an ionic or non-ionic group and polyisocyanate.

US2008/0090949 discloses an ink-jet receiving agent including a cationic polyurethane resin aqueous dispersion. The resin provides excellent waterproof characteristics on a coating which is formed after removing water from the dispersion. The cationic functional groups are obtained by using 3-(dimethylamino)-1,2-propanediol during the synthesis of the polyurethane polymer. This diol comprises a secondary OH-group which shows a very limited reactivity, limiting the length of the polymer chains and hence reducing the physical properties of the resin such as adhesion, scratch resistance, solvent and water resistance. Furthermore, the method of preparing these cationic polyurethanes as disclosed in US2008/0090949 is laborious.

As described above, there is great need for the development of an aqueous pigmented inkjet ink which lead to excellent image quality (high colour density, low coalescence and low inter-colour bleeding), preferably without the need of a pretreatment, does show long shelf life stability and which provides printed images showing excellent physical properties (adhesion, waterproof characteristics and wear resistance).

SUMMARY OF THE INVENTION

It is an object of the invention to provide a solution for the above stated problems. The object has been achieved by incorporating an aqueous pigment dispersion as defined below into an aqueous inkjet ink.

According to another aspect, the present invention includes an aqueous inkjet ink defined below.

According to another aspect, the present invention includes an inkjet recording method. This method is defined below.

Other features, elements, steps, characteristics and advantages of the present invention will become more apparent from the following detailed description of preferred embodiments of the present invention. Specific embodiments of the invention are also defined below.

DETAILED DESCRIPTION OF THE PREFERRED EMBODIMENTS

A. Aqueous Pigment Dispersion
A.1. Dispersing Agent

The aqueous pigment dispersion according to the invention is prepared by dispersing pigments in an aqueous medium with a dispersing agent having the general formula I

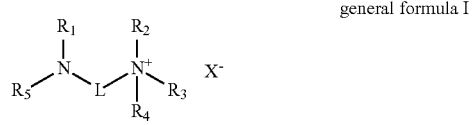

general formula I wherein $R_1$ is selected from the group consisting of a hydrogen, a substituted or unsubstituted alkyl group, a substituted or unsubstituted alkenyl group, a substituted or unsubstituted alkynyl group, a substituted or unsubstituted aralkyl group, a substituted or unsubstituted alkaryl group and a substituted or unsubstituted (hetero)aryl group L represents a divalent linking group comprising 2 to 10 carbon atoms $R_2$, $R_3$ and $R_4$ are independently selected from the group consisting of a substituted or unsubstituted alkyl group, a substituted or unsubstituted alkenyl group, a substituted or unsubstituted alkynyl group, a substituted or unsubstituted aralkyl group, a substituted or unsubstituted alkaryl group and a substituted or unsubstituted (hetero)aryl group $R_5$ represent a hydrocarbon group comprising at least 8 carbon atoms Any of $R_1$, $R_2$, $R_3$, $R_4$ and L may represent the necessary atoms to form a five to eight membered ring $X^-$ represents an anion to compensate the positive charge of the ammonium group.

In a preferred embodiment, $R_5$ represents a substituted or unsubstituted alkyl group, comprising at least 8 carbon atoms, more preferably at least 10 carbon atoms and most preferably at least 12 carbon atoms. In a particularly preferred embodiment, $R_5$ represents an unsubstituted alkyl group comprising at least 10 carbon atoms. In another preferred embodiment, $R_1$ is selected from the group consisting of a hydrogen and a substituted or unsubstituted alkyl group, a hydrogen and a C1 to C6 unsubstituted alkyl group being more preferred, a hydrogen being the most preferred. In a further preferred embodiment, L represents a divalent linking group comprising 2 to 8 carbon atoms, 2 to 6 carbon atoms being more preferred. In another preferred embodiment, $R_2$, $R_3$ and $R_4$ independently represent a substituted or unsubstituted alkyl group, a C1 to C6 unsubstituted alkyl group being more preferred, a methyl, an ethyl and a propyl group being the most preferred.

Typical dispersing agents, according to general formula I are given in Table 1 without being limited thereto.

TABLE 1

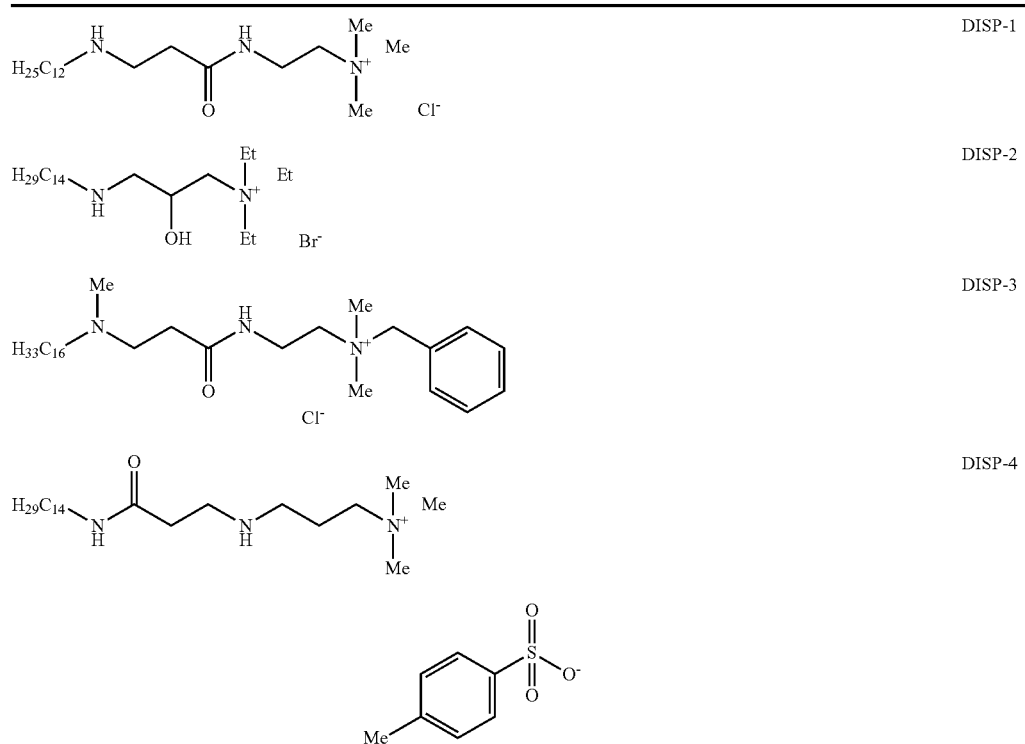

TABLE 1-continued

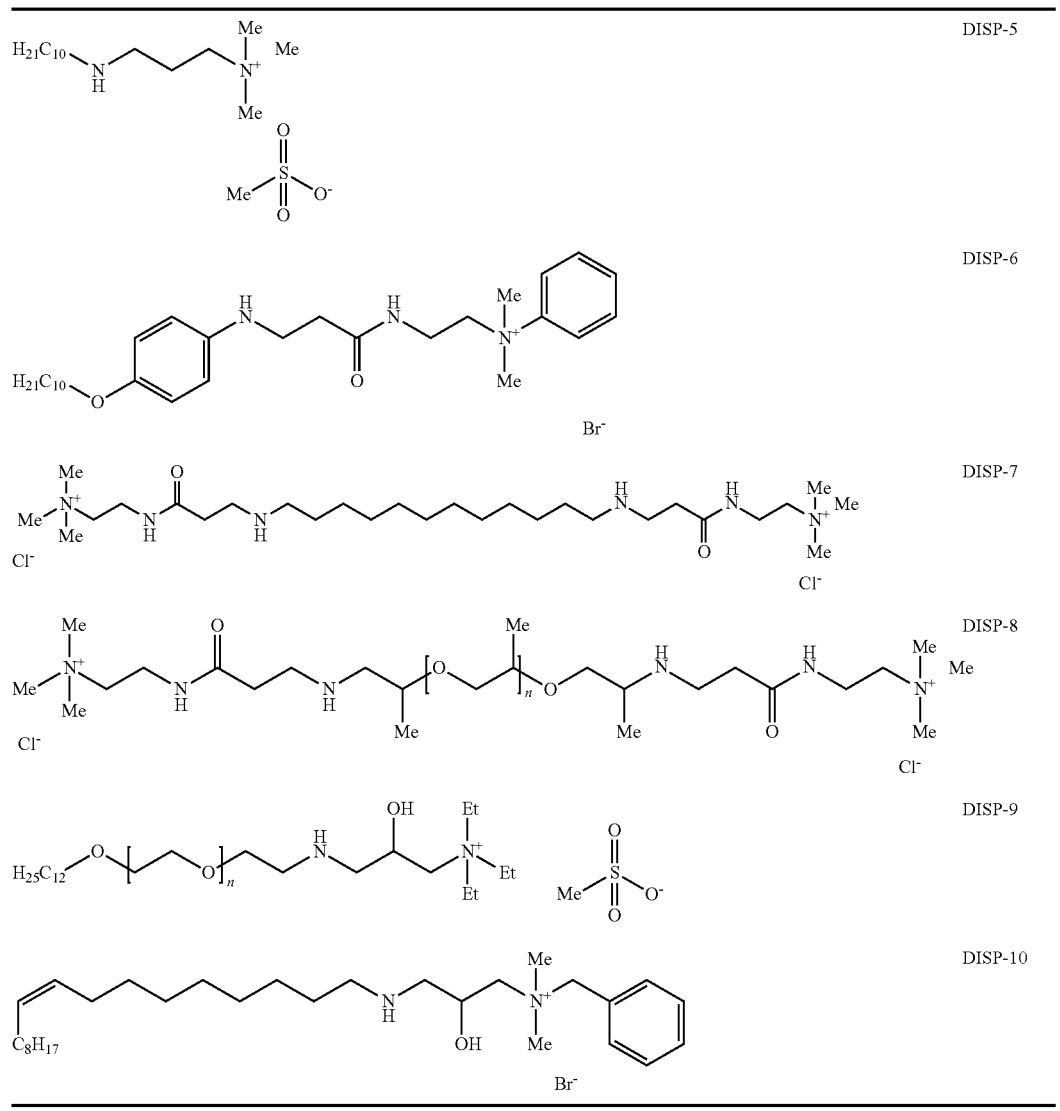

A.2. Pigment

The pigment of the dispersion according to the invention can be any pigment but is preferably a colored pigment. Examples include, but are not limited to, carbon black, and colored pigments such as anthraquinones, phthalocyanine, blues, phthalocyanine greens, diazos, monoazos, pyranthrones, perylenes, heterocyclic yellows, quinacridones, diketo-pyrrolo-pyrrolo pigments and (thio)indigoids. Representative examples of phthalocyanine blues include copper phthalocyanine blue and derivatives thereof (Pigment Blue 15). Representative examples of quinacridones include Pigment Orange 48, Pigment Orange 49, Pigment Red 122, Pigment Red 192, Pigment Red 202, Pigment Red 206, Pigment Red 207, Pigment Red 209, Pigment Violet 19 and Pigment Violet 42. Representative examples of anthraquinones include Pigment Red 43, Pigment Red 194 (Perlnone Red), Pigment Red 216 (Brominated Pyranthrone Red) and Pigment Red 226 (Pyranthrone Red). Representative examples of perylenes include Pigment Red 123 (Vermillion), Pigment Red 149 (Scarlet), Pigment Red 179 (Maroon), Pigment Red 190 (Red), Pigment Violet, Pigment Red 189 (Yellow Shade Red) and Pigment Red 224. Representative examples of thioindigoids include Pigment Red 86, Pigment Red 87, Pigment Red 88, Pigment Red 181, Pigment Red 198, Pigment Violet 36, and Pigment Violet 38. Representative examples of heterocyclic yellow include Pigment Yellow 117 and Pigment Yellow 138.

More preferably the pigment is selected from the groups of quinacridones and diketo-pyrrolo-pyrrolo pigments. Particularly preferred pigments are selected from the group consisting of Pigment Red 122, Pigment Violet 19 and mixed crystals of the above particular pigments. A commercially available example is Cinquasia Magenta RT-355-D from Ciba Specialty Chemicals. Examples of other suitable colored pigments are described in Colour Index, $3^{rd}$ edition (The Society of Dyers and Cikiyrusts, 1982).

Particularly useful for printing on dark textile is an aqueous inkjet ink containing the dispersion of the invention having a white pigment as pigment. The preferred pigment is titanium dioxide. Titanium dioxide ($TiO_2$) pigment useful in the present invention may be in the rutile or anatase crystalline form. Processes for making $TiO_2$ are described in greater detail in "The Pigment Handbook", Vol. I, 2nd Ed., John Wiley & Sons, NY (1988), the relevant disclosure of which is incorporated by reference herein for all purposes as if fully setforth.

The titanium dioxide particles can have a wide variety of average particle sizes of about 1 micron or less. For applications demanding high hiding or decorative printing applications, the titanium dioxide particles preferably have an average size of less than about 1 μm. Preferably, the particles have an average size of from about 50 to about 950 nm, more preferably from about 75 to about 750 nm, and still more preferably from about 100 to about 500 nm.

For applications demanding white colour with some degree of transparency, the pigment preference is "nano" titanium dioxide. "Nano" titanium dioxide particles typically have an average size ranging from about 10 to about 200 nm, preferably from about 20 to about 150 nm, and more preferably from about 35 to about 75 nm. An ink comprising nano titanium dioxide can provide improved chroma and transparency, while still retaining good resistance to light fade and appropriate hue angle. A commercially available example of an uncoated nano grade of titanium oxide is P-25, available from Degussa (Parsippany N.J.).

In addition, unique advantages may be realized with multiple particle sizes, such as opaqueness and UV protection. These multiple sizes can be achieved by adding both a pigmentary and a nano grade of $TIO_2$.

The titanium dioxide pigment may also bear one or more metal oxide surface coatings. These coatings may be applied using techniques known by those skilled in the art. Examples of metal oxide coatings include silica, alumina, alumina-silica, boria and zirconia, among others. These coatings can provide improved properties including reducing the photoreactivity of the titanium dioxide. Commercial examples of such coated titanium dioxides include R700 (alumina-coated, available from E.I. DuPont deNemours, Wilmington Del.), RDI-S (alumina-coated, available from Kemira Industrial Chemicals, Helsinki, Finland), R706 (available from DuPont, Wilmington Del.) and W-6042 (a silica alumina treated nano grade titanium dioxide from Tayco Corporation, Osaka Japan). Other suitable white pigments are given by Table 2 in [0116] of WO 2008/074548. The white pigment is preferably a pigment with a refractive index greater than 1.60. The white pigments may be employed singly or in combination. Preferably titanium dioxide is used as pigment with a refractive index greater than 1.60. Suitable titanium dioxide pigments are those disclosed in [0117] and in [0118] of WO 2008/074548.

In the pigment dispersion, it is desirable that the average particle diameter of the pigment particles be in the range of 0.01 to 1 μm, more preferably in the range of 0.01 to 0.5 μm, most preferably in the range of 0.01 to 0.2 μm. When the average particle diameter of the pigment particles is 0.2 μm or less, the problems concerning the reliability such as clogging of the nozzle and the storage stability of the ink composition can be effectively minimized. When the average particle diameter of the pigment particles is 0.01 μm or more, the advantages of the pigments for use in the present invention, ie., excellent light resistance and water resistance can be effectively exhibited, and aggregation of pigment particles can be prevented.

The pigment to dispersing agent ratio (by wt.) is preferably, from about 0.7 to about 3.2, more preferably, from about 1.0 to about 2.8 and most preferably from about 1.8 to about 2.4.

For dispersing the pigments, a variety of dispersion apparatus, for example, a ball mill, sand mill, roll mill, colloid mill, ultrasonic homogenizer, and high-pressure homogenizer can be employed. Using any of the abovementioned dispersion apparatus, a pigment and water serving as a solvent are mixed and dispersed, with the addition thereto of the dispersing agent as described above thereby obtaining the pigment dispersion of the invention. The whole amount or partial amount of the dispersing agent is preferably added during the dispersing step.

The pigment dispersion may contain up to 75 (wt.)% pigment, but will generally be in the range of approximately 0.1 to 30(wt.)%, preferably 0.1 to 15 (wt.)%, more preferably from 0.1 to 10 (wt.)%.

B. Ink Jet Ink

B.1. Pigment

It is preferable that the dispersed pigment be contained in the aqueous ink composition is up to 30% pigment by weight, but will generally be in the range of approximately 0.1 to 15%, preferably approximately 0.1 to 8%. by weight of the total ink composition. When the amount ratio of the pigment is 0.1 wt. % or more, sufficient saturation and image density can be obtained. When the amount ratio of the pigment is 30 wt. % or less, a decrease in color value can be prevented and the nozzles of a print head can be prevented from being clogged.

B.2. Resin

The aqueous ink jet ink composition comprising the pigment dispersion according to the invention may further comprise a resin, particles such as latex binders, polymeric capsules or polyethylene waxes. The resin can be selected from the group of acrylic based resins, urethane-modified polyester resins and polyurethane resins.

Polyurethane resin is to be incorporated in the ink formulation as a dispersion and may be selected from the group consisting of aliphatic polyurethane dispersions, aromatic polyurethane dispersions, anionic polyurethane dispersions, non-ionic polyurethane dispersions, aliphatic polyester polyurethane dispersions, aliphatic polycarbonate polyurethane dispersions, aliphatic acrylic modified polyurethane dispersions, aromatic polyester polyurethane dispersions, aromatic polycarbonate polyurethane dispersions, aromatic acrylic modified polyurethane dispersions, for example, or a combination of two or more of the above.

A preferred urethane resin to be used as dispersion in the ink of the invention is a polyester resin including a structural unit containing a urethane bond. Among such resins, a water-soluble or water-dispersible urethane-modified polyester resin is preferred. It is preferable that the urethane-modified polyester resin include at least one structural unit derived from a hydroxyl group-containing polyester resin (polyester polyol) and at least one structural unit derived from an organic polyisocyanate.

Furthermore, the hydroxyl group-containing polyester resin is a resin formed by an esterification reaction or transesterification reaction between at least one polybasic acid component and at least one polyhydric alcohol component.

Other preferred resins are the ones having a cationic group. Polymeric cationic polymers contain either guanidinium or fully quaternized ammonium functionalities, such as quaternized polyamine copolymers. Classes of cationic polymers that can be used include, but are not limited to, quaternized polyamines, dicyandiamide polycations, diallyldimethyl ammonium chloride copolymers, quaternized dimethylaminoethyl(meth)acrylate polymers, quaternized vinylimidazol polymers, alkyl guanidine polymers, alkoxylated polyethylene imines, and mixtures thereof. It is to be understood that one or more polycations may be used, and that any desirable combination of the polycations can be used. One or more ions of the cationic polyelectrolytes may be ion-exchanged for a nitrate, acetate, mesylate, or other ion.

Preferred cationic resins are polyurethane resins which have a cationic group incorporated in it. Suitable examples are: cationic polyurethane resins including a structural unit having a cationic amino group as disclosed by U.S. Pat. No. 8,426,511B, cationic polyurethane resins having a quaternized ammonium group in the backbone of the polymer as disclosed by JP2016153181A2, cationic polyester urethane resins obtained by reacting polyester polyols, polyols with a cationic group and polyisocyanate as disclosed in JP2015163678A, cationic polyurethane resins obtained by using 3-(dimethylamino)-1,2-propanediol during the synthesis of the polyurethane polymer as disclosed in US2008/0090949.

A particular preferred cationic polyester urethane resin to be included in the ink of the invention is a polyurethane resin obtainable by reacting a polyester polyol, a polyether diol, a polyol containing a cationic group and a polyisocyanate. Examples of suitable polyurethane resins and their preparations are disclosed in the unpublished patent application EP17203971.1 and are obtained by reacting polyester polyols, a polyether diol, a polyol containing a quaternary N-atom or amino group and a polyisocyanate. Other examples of suitable polyurethane resins and their preparations are disclosed in the unpublished patent application EP17203985.1 obtained by reacting polyester polyols, a diol containing a quaternary N-atom or tertiary amino group in a side chain from the carbon chain linking the 2 hydroxyl groups of the diol and a polyisocyanate.

Some examples of suitable polyurethane dispersions are NEOREZ R-989, NEOREZ R-2005, and NEOREZ R-4000 (DSM NeoResins); BAYHYDROL UH 2606, BAYHYDROL UH XP 2719, BAYHYDROL UH XP 2648, and BAYHYDROL UA XP 2631 (Bayer Material Science); DAOTAN VTW 1262/35WA, DAOTAN VTW 1265/36WA, DAOTAN VTW 1267/36WA, DAOTAN VTW 6421/42WA, DAOTAN VTW 6462/36WA (Cytec Engineered Materials Inc., Anaheim Calif.); and SANCURE 2715, SANCURE 20041, SANCURE 2725 (Lubrizol Corporation), for example, or a combination of two or more of the above.

Acrylic based resins include polymers of acrylic monomers, polymers of methacrylic monomers, and copolymers of the aforementioned monomers with other monomers. These resins are present as a suspension of particles (latex) having an average diameter of about 30 nm to about 300 nm. The acrylic latex polymer is formed from acrylic monomers or methacrylic monomer residues. Examples of monomers of the acrylic latex polymer include, by way of illustration, acrylic monomers, such as, for example, acrylate esters, acrylamides, and acrylic acids, and methacrylic monomers, such as, for example, methacrylate esters, methacrylamides, and methacrylic acids. The acrylic latex polymer may be a homopolymer or copolymer of an acrylic monomer and another monomer such as, for example, a vinyl aromatic monomer including, but not limited to, styrene, styrene butadiene, p-chloromethylstyrene, divinyl benzene, vinyl naphthalene and divinylnaphthalene.

Some examples of suitable acrylic latex polymer suspensions are, JONCRYL 537 and JONCRYL 538 (BASF Corporation, Port ArthurTX); CARBOSET GA-2111, CARBOSET CR-728, CARBOSET CR-785, CARBOSET CR-761, CARBOSET CR-763, CARBOSET CR-765, CARBOSET CR-715, and CARBOSET GA-4028 (Lubrizol Corporation, Rancho Santa Margarita Calif.); NEOCRYL A-1110, NEOCRYL A-1131, NEOCRYL A-2091, NEOCRYL A-1127, NEOCRYL XK-96, and NEOCRYL XK-14 (DSM NeoResins, Sluisweg, The Netherlands); and BAYHYDROL AH XP 2754, BAYHYDROL AH XP 2741, BAYHYDROL A 2427, and BAYHYDROL A2651 (Bayer Material Science, Baytown Tex.), for example, or a combination of two or more of the above.

Besides resin and latices, polymeric capsules can be advantageously incorporated in the ink comprising the pigment dispersion of the invention. Useful polymeric capsules are the microcapsules disclosed in JP 2003-313476 and the nanocapsules disclosed in EP313198A. Preferably nanocapsules can be used which comprise a core having reactive chemistry which may be thermally reactive chemistry activatable directly by heat or indirectly using an optothermal converting agent. These nanocapsules are described in [0059-0067] of EP313198A. In the latter, for example an infrared absorbing dye converts the infrared light of an infrared laser or infrared LEDs into heat.

More preferably, nanocapsules having a shell surrounding a core, the shell comprising cationic dispersing groups as disclosed in the application WO2018/138069 can be used. The presence of cationic groups improve the compatibility of the nanocapsules with the pigment dispersion particles in the aqueous ink. Preferably the cationic dispersing groups are selected from the group consisting of protonated amines, protonated nitrogen containing heteroaromatic compounds, quaternized tertiary amines, N-quaternized heteroaromatic compounds, sulfoniums and phosphoniums. The core may comprise chemical reactants which are capable of forming a reaction product upon application of heat and/or light, preferably the chemical reactant is a thermally reactive crosslinker, more preferably a blocked isocyanate. The capsules described in [0026-0052] of WO2018/138069 are particularly suited to be combined with the pigment dispersion of the invention in an aqueous ink jet ink.

The concentration of the resin in the ink jet ink according to the invention is at least 0.5 (wt.)% and preferably lower than 30 (wt.)%, more preferably between 1 and 20 (wt.)%.

B.3. Water Soluble Organic Solvent

The aqueous ink jet ink comprising the dispersion of the invention may contain, besides water as a solvent, also a water-soluble organic solvent. Examples of water-soluble organic solvents include polyhydric alcohols such as diethylene glycol, triethylene glycol, dipropylene glycol, 1,3-propanediol, 1,3-butanediol, 1,4-butanediol, 2,2-dimethyl-1,3-propanediol, 2-methyl-1, 3-propanediol, 1,2-pentanediol, 2,4-pentanediol, 1,5-pentanediol, 1,6-hexanediol, 2-ethyl-1,3-hexanediol, 1,2-hexanediol and 2,5-hexanediol, polyhydric alcohol alkyl ethers such as dipropylene glycol n-propyl ether, tripropylene glycol methyl ether, tripropylene glycol n-propyl ether, propylene glycol phenyl ether, triethylene glycol methyl ether, triethylene glycol methyl ether, triethylene glycol ethyl ether, diethylene glycol n-hexyl ether and ethylene glycol phenyl ether, and nitrogen-containing heterocyclic compounds such as 2-pyrrolidone and N-methylpyrrolidone.

Other preferred water soluble organic solvents include ethylene glycol, propylene glycol, 1,2-butanediol, 2,3-butanediol, 2-methyl-2, 4-pentanediol, dipropylene glycol monomethyl ether, propylene glycol n-butyl ether, propylene glycol t-butyl ether, diethylene glycol methyl ether, ethylene glycol n-propyl ether and ethylene glycol n-butyl ether.

The content of the water-soluble organic solvent, in the aqueous ink jet ink is preferably less than 70 wt. %. If the content exceeds 70% by mass, the ink loses its water based, hence more green character.

B.4. Surfactant

In the aqueous ink of the present invention, a surfactant may be added in order to ensure wettability onto the substrate. The amount of the surfactant added is preferably 0.1 wt. % to 5 wt. % as an active component in the ink.

If the amount added is below 0.1% by mass, wettability onto the substrate is not sufficient and causes degradation in image quality and in adhesion to the substrate. The surfactant that can be used is not particularly limited as long as it satisfies the above limitation.

While any of an amphoteric surfactant, a non-ionic surfactant, and a cationic surfactant can be used, non-ionic surfactants such as polyoxyethylene alkyl phenyl ether, polyoxyethylene alkyl ester, polyoxyethylene alkylamine, polyoxyethylene alkyl amide, a polyoxyethylene propylene block polymer, sorbitan fatty acid ester, polyoxyethylene sorbitan fatty acid ester and an ethylene oxide adduct of acetylene alcohol are preferably used in terms of a relationship between dispersing stability and image quality. In addition, a fluorine-based surfactant and a silicon-based surfactant can be used in combination (or singly) depending on formulation.

Suitable surfactants are siloxane based surfactants such as Tego Twin 4000 from Evonik Industries, Tegowet 270 from Evonik industries, Hydropalat WE3220 from BASF, silane based surfactants such as Silwet HS312 from Momentive and fluor containing surfactants such as: Thetawet FS8150 from Neochem GMBH, Capstone FS3100 from Dupont, Tivida FL2500 from Merck and surfactants from the Dynol, Envirogem & Surfynol series from Air products.

C. Printing Method

Printing methods using aqueous inkjet inks comprising the pigment dispersion of the invention include at least the steps of: a) applying the aqueous inkjet ink containing the dispersed particles of the invention by means of an inkjet technique onto a substrate; and b) applying heat and/or radiation to dry the jetted ink.

The aqueous ink jet ink according to the present invention is suitable to be jetted on different substrates, porous and non-porous ones. Porous substrates include paper, card board, white lined chipboard, corrugated board, packaging board, wood, ceramics, stone, leather and textile fabrics. Non-porous substrates include metal, synthetic leather, glass, polypropylene, polyvinylchloride, PET, PMMA, polycarbonate, polyamide, polystyrene or co-polymers thereof.

Suitable textile fabrics can be made of one type of fibre or blended fibre of two or more selected from the group consisting of cotton, hemp, rayon fibre, acetate fibre, silk, nylon fibre, and polyester fibre. The fabric may be in any form, for example, a woven, knitted, or nonwoven form of the abovementioned fibres.

The aqueous inkjet ink according to the invention is jetted onto a substrate. The substrate can be pre-treated by applying a pre-treatment liquid. This is particularly useful on textile fabrics as substrate.

The pre-treatment liquid typically containing a flocculant may be applied to the substrate by spraying, coating, pad printing or jetting using an ink jet head or valve jet head. These last means of applying a pre-treatment liquid have the advantage that the amount of required pre-treatment liquid is substantially lower than with the other application methods. By means of an ink jet head, it is possible to apply the pre-treatment liquid onto areas of the substrate or textile fabric where the image should be printed.

Substrates and textile fabrics to which a pre-treatment liquid has been applied may be dried before applying the aqueous ink according to the invention. After drying, the pre-treated textile may optionally undergo a heat treatment, before the subsequent ink jetting step with ink. Examples of the heating process include, but are not limited to, heat press, atmospheric steaming, high-pressure steaming and THERMOFIX. Any heat source can be used for the heating process; for example, an infrared ray lamp can be employed.

A preferred ink jet head for the jetting of the ink according to the invention is a piezoelectric ink jet head. Piezoelectric inkjet jetting is based on the movement of a piezoelectric ceramic transducer when a voltage is applied thereto. The application of a voltage changes the shape of the piezoelectric ceramic transducer in the print head creating a void, which is then filled with ink. When the voltage is again removed, the ceramic expands to its original shape, ejecting a drop of ink from the ink jet head. However, the jetting of the ink according to the present invention is not restricted to piezoelectric inkjet printing. Other inkjet print heads can be used and include various types, such as a continuous type, a thermal print head type and a valve jet type.

After the ink jetting step, the printed substrate is dried. The drying step can be performed at the air or by using heat sources; examples include equipment for forced-air heating, radiation heating such as IR-radiation, including NIR- and CIR radiation, conduction heating, high-frequency drying, and microwave drying. The drying step is carried at a temperature preferably below 150° C., more preferably below 100° C., most preferably below 80° C.

After the drying step, heat can also be applied to the dried substrate. This is particularly useful with textile fabrics as substrate and when the resin in the aqueous ink jet ink according to the invention comprises a resin as a latex or a capsule. The heat treatment is preferably at 110 to 200° C., more preferably 130 to 160° C. Heating at 110° C. or higher enables the flow of the latex or enables a thermally reactive crosslinker in the core of a capsule to be fixed to the fibres of the fabric.

Examples

Measurement Methods

1. Viscosity

The viscosity of the inks was measured at 32° C. using a "Robotic Viscometer Type VISCObot" from CAMBRIDGE APPLIED SYSTEMS.

2. Particle Size

The particle size of the pigment particles in an ink was measured on a Zetasizer™ Nano-S (Malvern Instruments, Goffin Meyvis).

3. Stability

Ink stability was evaluated numerically and visually. If the relative viscosity of the ink increases more than 40% after being stored for 1 week at 60° C. the ink is called unstable. If the ink solidifies or if phase separation can be seen, the ink is called unstable.

4. Crock Fastness

Test images were printed with a Fujifilm Dimatix DMP-2831 using disposable Standard Dimatix 10 pL cartridges that were filled with the ink jet inks of the examples. Prints were done using the Standard Tickle 5 kHz waveform and cartridge settings. After printing on a fabric, the ensemble was dried for 5 min at 160° C. and a dry crock test is done according to ISO105-X12. Coloration of the white rubbing cloth is evaluated based on the ΔE from Cielab measurements as shown in Table 2.

TABLE 2

| ΔE | Score |
| --- | --- |
| ΔE ≤ 6 | 1 |
| 6 ≤ ΔE ≤ 8.5 | 2 |
| 16.9 ≥ ΔE ≥ 8.5 | 3 |
| ΔE ≥ 16.5 | 4 |

Materials

All materials used in the following examples were readily available from standard sources such as Sigma-Aldrich (Belgium) and Acros (Belgium) unless otherwise specified. The water used was demineralised water.

Chromofine Magenta 6878 was supplied by Dainichiseika Color and Chemicals.
3-acrylamidopropyl)trimethylammonium chloride: supplied as 75 wt. % in water by Aldrich
Acetone is acetone p.a. supplied by VWR International
Vylon 220 is a polyester polyol containing terephthalic ester and isophthalic ester units obtained from Toyobo
3-(Dimethylamino)-1,2-propanediol=CAS Registry Number 623-57-4 supplied by Aldrich
Ymer N120 is 1,3 diol polyether supplied by Perstorp
Genocure MDEA, 2,2'-(methylimino)diethanol, by Rahn AG
DBTL is dibutyl tin laurate (KEVER-KAT DBTL 162) supplied by Brenntag
IPDI is a Vestanat IPDI, isocyanate supplied by Evonik
BD is 1,4-butane diol supplied by Acros
Triethylamine is triethylamine supplied by Acros
GLYC is glycerol
SUBST-1 is a cotton fabric (Fine Warp Satin) without special coating from Premier Textiles, UK
SUBST-2 is a polyester/cotton fabric (plain) without special coating from Premier Textiles, UK Polyurethane Resin Dispersion PU-1

In an Erlenmeyer of 500 ml the following compounds were weighed: 104.22 g of Vylon 220, 15.30 g of Ymer N120, and 201.45 g of acetone. The Ymer N120 was preheated in an oven at 80° C., in order to obtain a liquid which can be easily handled. The mixture weighed in the Erlenmeyer was stirred using a magnetic stirrer and heated to 45° C. A clear solution was obtained and cooled to room temperature which will be later on used in the reaction. In a 500 ml 3 necked round bottom flask equipped with a coiled condenser and stirrer, 4.61 g of Genocure MDEA was added. The prepared polyol solution (Vylon 220+Ymer N120) was added to Genocure MDEA present in the 500 ml 3 necked round bottom flask. 1.07 g of DBTL was diluted in 9.67 g of acetone and also added to the polyol mixture. Then the reactor was heated to 55° C. during appr. 35 minutes, allowing the Genocure MDEA to dissolve homogenously. Subsequently 34.04 g of IPDI was added dropwise via an addition funnel with pressure equalization arm during 20 minutes. The amount isocyanate added was an excess towards the hydroxyl amount, ie. NCO/OH=1.53). The reaction was allowed to take place during 2 hours at 55° C. The isocyanato terminated pre-polymer and free IPDI which was available in excess was then further reacted using a diol as chain extender. As diol 4.78 g of 1.4 BD was used. The reaction mixture was cooled to 40° C., in order to avoid evaporation of acetone. The reaction mixture was then allowed to react overnight during 20 hours at 40° C. s in order to reach full conversion.

From the solution 170.66 g (43.68% solids) was weighed in a stainless steel vessel and 1.07 g of acetic acid was added to acidify the amine groups from the Genocure MDEA present in the polyurethane resin. Subsequently the water based dispersion was made using Disperlux equipment adding water during high shear mixing. Under stirring at 900 RPM using a 9 cm diameter dissolver stirrer 139.31 g of water was added during 20 minutes to the 171.73 g of acidified PU solution. The acetone in the obtained dispersion was evaporated on a rotary evaporator. In order to avoid foaming the evaporation was started at a lower vacuum. The evaporation was stopped when also water was evaporated at a pressure of 60 mbars and a 40° C. heating bath. Based on the weight the concentration was corrected by adding water to 35%. The exact solid content was determined by drying 1 g of solution on an aluminum dish at 130° C. during 120 minutes. The solid content obtained was 35.90%. The pH measured 6.02. Particle size measurement using Zetasizer: 74 nm.

The Synthesis of Dispersing Agent DISP-1

29 g (0.105 mol) (3-acrylamidopropyl)trimethylammonium chloride is dissolved in 150 g isopropanol. 18.5 g (0.1 mol) dodecyl amine and 15 g (0.148 mol) triethyl amine were added and the mixture was heated to 80° C. for 24 hours. The solvent was removed under reduced pressure. DISP-1 was used as pigment dispersant without further purification.

Magenta Pigment Dispersion MAG-1

2 g of Chromofine Magenta 6878 was added to a solution of 1 g DISP-1 in 17 ml water. 100 g 0.4 mm yttrium stabilized zirconia beads ("high wear resistant zirconia grinding media" from TOSOH Co.) was added and the pigment was milled for 3 days on a roll mill. The zirconia beads were removed by filtration and the dispersion was filtered over a 1.6 µm filter. The dispersion MAG-1 had an average particle size of 80 nm.

Magenta ink MAGINK-1

The magenta pigment dispersion, described above, was used for the formulation of a cationic magenta ink MAGINK-1 as displayed in Table 3. All weight percentages are based on the total weight of the inkjet ink.

TABLE 3

| Compound | Wt. % |
| --- | --- |
| MAG-1 | 20 |
| PU-1 | 25 |
| Water | 15 |
| GLYC | 40 |

All components were mixed and stirred for 5 minutes. The ink MAGINK-1 was filtered over a 1.6 micron filter. The viscosity at 20° C. was 7.5 mPas.

Printing of the Inventive Ink MAGINK-1

A solid area of MAGINK-1 was printed on an untreated cotton (SUBST-1) and on a mixed fiber (SUBST-2) fabrics, using a Dimatix™ DMP2831 system, equipped with a standard Dimatix™ 10 pl print head. The ink was jetted at 22° C., using a firing frequency of 5 kHz, a firing voltage of 20 V and a standard waveform. All nozzles printed smoothly.

Evaluation of the Inventive Ink MAGINK-1 on Different Fabrics

The printed image was dried and given a thermal treatment at 160° C. for 5 minutes. The dry crock fastness was measured on both the cotton and mixed fibre. On both fabrics a score of 2 to 3 was obtained, showing that the inventive ink MAGINK-1 has an acceptable crock performance on both cotton and mixed fibre fabrics. (ΔE=8.7 on SUBST-1 and ΔE=6.7 on SUBST-2).

Storage Stability of the Ink

The inventive ink INKMAG-1 was stored at 60° C. for 7 days. The viscosity and the average particle size of the ink was measured before and after storage. Both the average particle size and the viscosity did not change more than 10% of the initial value demonstrating that the ink has at least a shelf life of 7 days at 60° C.

The invention claimed is:

1. An aqueous pigment dispersion comprising:
    a pigment; and
    at least one dispersing agent having the formula I:

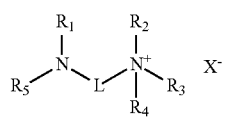

formula I wherein
    $R_1$ is selected from the group consisting of a hydrogen, a substituted or unsubstituted alkyl group, a substituted or unsubstituted alkenyl group, a substituted or unsubstituted alkynyl group, a substituted or unsubstituted aralkyl group, a substituted or unsubstituted alkaryl group, and a substituted or unsubstituted (hetero)aryl group;
    L represents a divalent linking group including 2 to 10 carbon atoms;
    $R_2$, $R_3$, and $R_4$ are independently selected from the group consisting of a substituted or unsubstituted alkyl group, a substituted or unsubstituted alkenyl group, a substituted or unsubstituted alkynyl group, a substituted or unsubstituted aralkyl group, a substituted or unsubstituted alkaryl group, and a substituted or unsubstituted (hetero)aryl group;
    any of $R_1$, $R_2$, $R_3$, $R_4$, and L may represent atoms necessary to form a five to eight membered ring;
    $R_5$ represents a hydrocarbon group including at least 8 carbon atoms; and
    $X^-$ represents an anion to compensate for a positive charge of the ammonium group.

2. The aqueous pigment dispersion according to claim 1, wherein $R_5$ represents a substituted or unsubstituted alkyl group including at least 8 carbon atoms.

3. The aqueous pigment dispersion according to claim 1, wherein the pigment is selected from the group consisting of a quinacridone and a diketo-pyrrolo-pyrrolo-pigment.

4. The aqueous pigment dispersion according to claim 2, wherein the pigment is selected from the group consisting of a quinacridone and a diketo-pyrrolo-pyrrolo-pigment.

5. The aqueous pigment dispersion according to claim 1, wherein the pigment is selected from the group consisting of Pigment Orange 48, Pigment Orange 49, Pigment Red 122, Pigment Red 192, Pigment Red 202, Pigment Red 206, Pigment Red 207, Pigment Red 209, Pigment Violet 19, and Pigment Violet 42.

6. The aqueous pigment dispersion according to claim 2, wherein the pigment is selected from the group consisting of Pigment Orange 48, Pigment Orange 49, Pigment Red 122, Pigment Red 192, Pigment Red 202, Pigment Red 206, Pigment Red 207, Pigment Red 209, Pigment Violet 19, and Pigment Violet 42.

7. An aqueous inkjet ink comprising:
    the aqueous pigment dispersion according to claim 1.

8. An aqueous inkjet ink comprising:
    the aqueous pigment dispersion according to claim 3.

9. The aqueous inkjet ink according to claim 7, wherein the aqueous pigment dispersion is present in an amount from 0.1 wt % to 30 wt %.

10. The aqueous inkjet ink according to claim 8, wherein the aqueous pigment dispersion is present in an amount from 0.1 wt % to 30 wt %.

11. The aqueous inkjet ink according to claim 7, further comprising:
    a resin or a capsule including a shell surrounding a core; wherein
    the shell includes cationic dispersing groups and the core includes a chemical reactant which is capable of forming a reaction product upon application of heat and/or light.

12. The aqueous inkjet ink according to claim 8, further comprising:
    a resin or a capsule including a shell surrounding a core; wherein
    the shell includes cationic dispersing groups and the core includes a chemical reactant which is capable of forming a reaction product upon application of heat and/or light.

13. The aqueous inkjet ink according to claim 11, wherein the resin is a polyurethane resin obtainable by reacting a polyester polyol, a polyol containing a quaternary N-atom or an amino group, and a polyisocyanate.

14. The aqueous inkjet ink according to claim 12, wherein the resin is a polyurethane resin obtainable by reacting a polyester polyol, a polyol containing a quaternary N-atom or an amino group, and a polyisocyanate.

15. The aqueous inkjet ink according to claim 13, wherein the polyester polyol is obtained by reacting an aromatic polycarboxylic acid and a polyol.

16. The aqueous inkjet ink according to claim 11, wherein the chemical reactant is a thermally reactive crosslinker.

17. The aqueous inkjet ink according to claim 12, wherein the chemical reactant is a thermally reactive crosslinker.

18. An inkjet recording method comprising:
    providing a substrate;
    printing an image by jetting the aqueous ink jet ink according to claim 7 on a surface of the substrate; and
    drying the image jetted onto the surface of the substrate.

19. The inkjet recording method according to claim 18, further comprising:
    heating the image jetted and dried on the substrate to a temperature of at least 110° C.

* * * * *